Patented Jan. 7, 1930

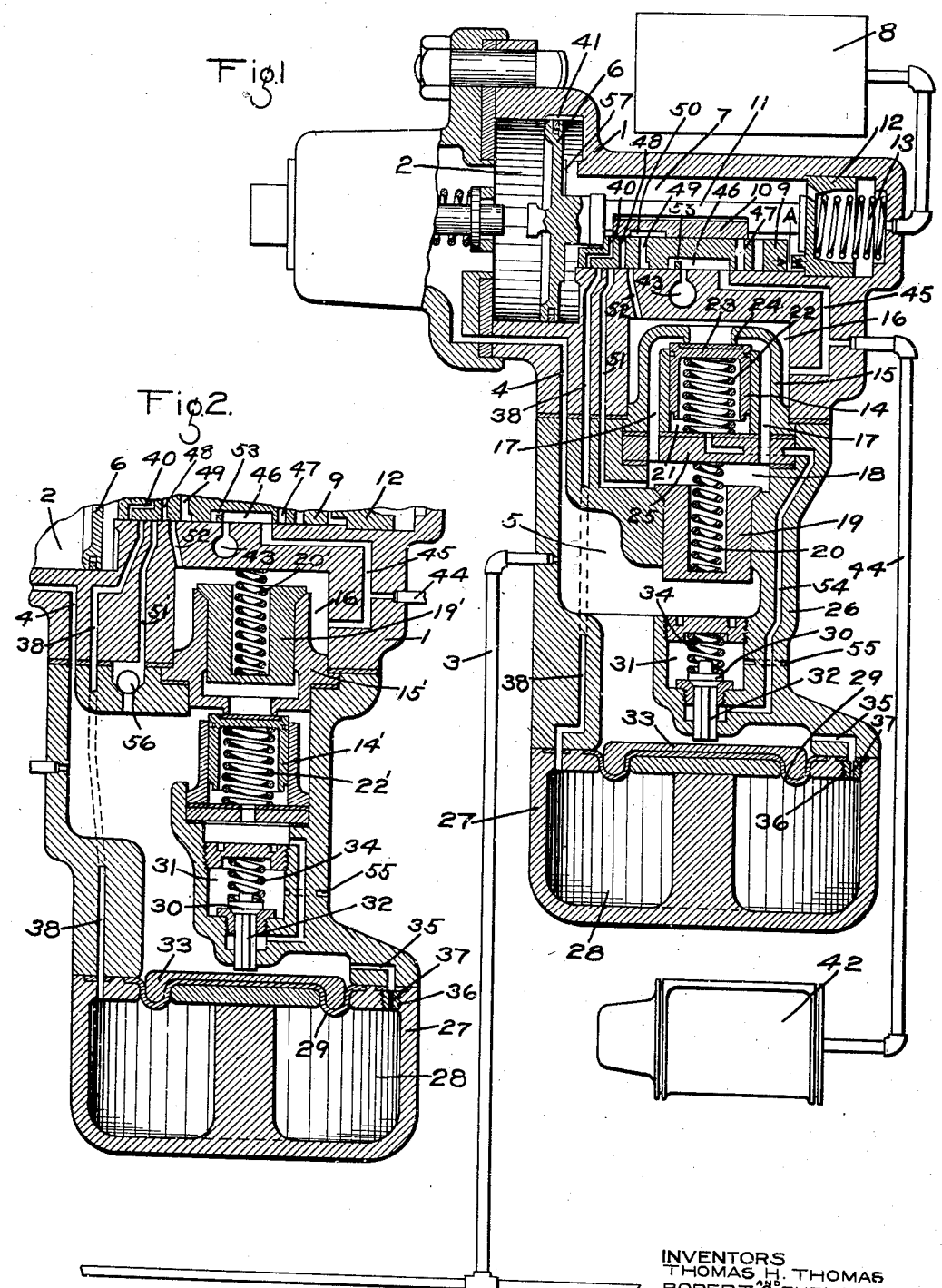

1,742,426

UNITED STATES PATENT OFFICE

THOMAS H. THOMAS, OF EDGEWOOD, AND ROBERT C. BURNS, OF BELLWOOD, PENNSYLVANIA, ASSIGNORS TO THE WESTINGHOUSE AIR BRAKE COMPANY, OF WILMERDING, PENNSYLVANIA, A CORPORATION OF PENNSYLVANIA

TRIPLE VALVE DEVICE

Application filed May 12, 1928. Serial No. 277,359.

This invention relates to fluid pressure brakes of the type having means operated upon a sudden reduction in brake pipe pressure for effecting a local reduction in brake pipe pressure and thereby causing quick serial action of the brake controlling valve devices throughout the train.

It has heretofore been proposed to provide a quick action valve device having valve means for venting fluid from the brake pipe and a movable abutment subject to the opposing pressures of the brake pipe and a chamber adapted to be charged from the brake pipe, said movable abutment being adapted to operate said valve means to effect a local reduction in brake pipe pressure when the brake pipe pressure is reduced at a sudden or emergency rate.

The volume of the quick action chamber should be small enough, so as to permit flow of fluid from the chamber to the brake pipe during a service application of the brakes without interfering with the proper functioning in a service application and should also be small, so that it can easily be associated with a triple valve device, but with a quick action chamber having a small volume, if the port through which fluid is vented from the quick action chamber back to the brake pipe is of proper size to reduce the pressure in the quick action chamber at a service rate, it will be too large to function as a charging port, for the reason that in releasing the brakes, the quick action chamber will be overcharged when the brake valve handle is placed in full release position, so that when the brake valve handle is moved to running position, the subsidence of pressure in the brake pipe to the normal pressure carried, if at an emergency rate of reduction will permit the overcharged pressure in the quick action chamber to operate the movable abutment and the quick action valve means so as to cause quick action when not closed.

The principal object of our invention is to provide a quick action controlling mechanism in which the above difficulties are overcome.

By means of our invention, in charging, the volume of the quick action chamber is enlarged, so as to prevent the chamber from becoming overcharged, while in applying the brakes, the volume of the quick action chamber remains small, so as to function as hereinbefore explained.

In the accompanying drawing, Fig. 1 is a sectional view of a triple valve device showing our invention embodied therein; and Fig. 2 a sectional view similar to Fig. 1, showing a slightly modified form of our invention.

The triple valve device shown in the drawing, is of the type employed in railway brake service and having means for retarding the release of the brakes and comprises a casing 1 having a piston chamber 2 connected to the brake pipe 3 through passage 4 and chamber 5 and containing piston 6 and having a valve chamber 7 connected to the usual auxiliary reservoir 8 and containing a main slide valve 9 and a graduating slide valve 10 adapted to be operated by piston 6.

For retarding the release of the brakes, the piston stem 11 engages a yielding stop member 12 in the full release position of piston 6 and movement of the triple valve parts to the retarded release position is yieldingly opposed by spring 13, which acts on the member 12.

Disposed in a chamber of the casing 1 is a brake pipe vent valve which may be in the form of a valve piston 14 preferably mounted in a separate casing member 15. The casing member 15 is mounted in chamber 16 of the casing 1 and is provided with passages 17, which lead from the upper face of valve piston 14 to a chamber 18 containing a check valve 19. The check valve 19 is urged to its seat by a spring 20 and permits flow of fluid from chamber 5 and the brake pipe to chamber 18.

The chamber 21 at one side of the valve piston 14 contains a coil spring 22 which acts on the valve piston and urges same upwardly so that the seat 23 engages a seat ring 24. The chamber 16 into which the casing member 15 extends may be the usual quick action piston chamber of the usual triple valve device. The casing member 15 is provided with a cover plate 25 which is clamped to the member 15 when the casing section 26 is applied to the casing 1.

Secured to the casing section 26 is a casing section 27 in which a quick action chamber 28 is provided and clamped between the casing sections 26 and 27 is a flexible diaphragm 29. A poppet valve 30, disposed in a chamber 31, is provided with a fluted stem 32 adapted to be engaged by a diaphragm follower plate 33 when the diaphragm 29 is moved upwardly. The valve 30 is urged to its seat by a spring 34.

A passage 35 connects brake pipe chamber 5 with quick action chamber 28 and disposed in said passage in a choke plug 36 having a passage 37 of such flow capacity as to permit flow from chamber 28 to the brake pipe chamber 5 at a rate corresponding with the maximum rate at which the brake pipe pressure is reduced to effect a service application of the brakes, so that the diaphragm 29 will not be operated when a service reduction in brake pipe pressure is effected.

A passage 38 from chamber 28 leads to the seat of main slide valve 9 and in the retarded release position is adapted to register with a port 40 through the slide valve 9.

In operation, when the brake pipe 3 is charged with fluid under pressure with the piston 6 in normal full release position, as shown in the drawing, fluid flows from piston chamber 2 through feed groove 41 and charges the valve chamber 7 and the auxiliary reservoir 8. Fluid under pressure also flows from brake pipe chamber 5 through passage 35 and the restricted port 37 to charge the quick action chamber 28.

In full release position of the triple valve device, the brake cylinder 42 is connected to the usual exhaust port 43 through pipe 44, passage 45 and cavity 46 in slide valve 9.

When the brake pipe pressure is reduced at a service rate to effect a service application of the brakes, the piston 6 moves outwardly, causing the initial movement of the graduating valve to uncover the service port 47 and connect ports 48 and 49 through cavity 50. The slide valve 9 is then moved so as to cause ports 48 and 49 to register with passages 51 and 52, so as to produce a local quick service venting of fluid from the brake pipe chamber 5, past check valve 19, through passage 51, port 48, cavity 50, port 49, passage 52, to chamber 16 and thence to the brake cylinder through passage 45 and pipe 44.

Port 47 registers with passage 45, so that fluid under pressure is supplied from the auxiliary reservoir to the brake cylinder to effect a service application of the brakes.

When the brake pipe pressure is thus reduced, the pressure in quick action chamber 28 is also reduced by flow through the restricted port 37, so that the opposing pressures on the diaphragm 29 remain substantially balanced, since if the maximum service rate of reduction in brake pipe pressure is not exceeded, the flow area or capacity of port 37 is sufficient to permit such a rate of flow.

When it is desired to release the brakes the usual brake valve handle is first turned to release position, in which fluid under pressure is supplied to the brake pipe from the main reservoir. On the cars at the head end of the train, where the brake pipe pressure is temporarily increased above the standard pressure carried in the brake pipe, the triple valve pistons are moved to the retarded release position, in which the slide valve 9 is moved so that the brake cylinder is connected to the exhaust port 43 only through a restricted port 53. In the inner retarded release position, the recharge of the auxiliary reservoir by way of feed groove 41 is also retarded, since the flow is restricted by having to pass through a restricted port 57 in the piston, which port is formed as a radial groove provided in the annular raised seating face of the piston 6.

In the retarded release position, port 40 registers with passage 38, so that while fluid under pressure flows from the brake pipe chamber 5 through port 37 to quick action chamber 28, it cannot increase the pressure in chamber 28, without increasing the pressure in the valve chamber 7 and the auxiliary reservoir 8. The volume of the auxiliary reservoir being relatively large, the quick action chamber will consequently not become overcharged.

The triple valve pistons in the train having been moved to release position by the increase in brake pipe pressure due to the movement of the brake valve to full release position, the brake valve is moved to running position, in which the brake pipe pressure is maintained at the standard degree of pressure carried in the system by the operation of the usual feed or reducing valve device.

The brake pipe pressure then substantially equalizes throughout the train and the auxiliary reservoir pressure having equalized with the brake pipe pressure by flow through the feed groove 41, the piston 6 moves from the retarded release position to the full release position and first moves the graduating valve 10 relatively to the main valve 9, since a lost motion space indicated at A in the drawing, is provided between the retarded release stop 12 and the main slide valve 9. This lost motion is sufficient to permit the graduating valve 10 to close the port 40 before the main slide valve moves and consequently, communication from the auxiliary reservoir to the quick action chamber 28 is cut off, so that if a reduction in brake pipe pressure should thereafter be made so as to effect a service application of the brakes, only fluid from the quick action chamber 28 can flow back to the brake pipe through the port 37 and the volume of the quick action chamber being small, the proper functioning in a service application of the brakes is not disturbed, by flow of fluid under pressure into the brake pipe.

On cars at the rear of the train, when the brake pipe pressure is increased as hereinbefore described, to effect the release of the brakes, the triple valve pistons will move only to full release position, in which the main slide valve is in the position shown in Fig. 1, the port 40 not being brought into registry with the passage 38.

In this case, the auxiliary reservoir is recharged through the feed groove 41 and the quick action chamber is recharged through the port 37, but since the brake pipe pressure at the rear of the train is not increased above normal, the quick action chambers at the rear of the train are not overcharged.

When the brake pipe pressure is reduced at an emergency rate by operation of the brake valve device or at any point in the train, any diaphragm 29 which may be subjected to a reduction in brake pipe pressure at an emergency rate will be moved upwardly by the higher pressure in the quick action chamber 28, since the port 37 will only permit back flow at the maximum service rate of reduction.

The upward movement of the diaphragm 29 causes the diaphragm to engage the stem of the valve 32 and thereby move the valve 30 from its seat. Fluid under pressure is then vented from chamber 21 through passage 54 and past the open valve 30 to the atmosphere by way of passage 55. The chamber 18 being charged with fluid under pressure from the brake pipe, as supplied past the check valve 19, the brake pipe pressure acting on the upper area of the valve piston 14, which is exposed to this pressure, outside of the seat rib 24, will shift the valve piston 14 downwardly and open communication from chamber 18 to chamber 16.

Fluid under pressure is then vented from the brake pipe, past the check valve 19 to chamber 16 and thence to the brake cylinder 42, so that a local reduction in brake pipe pressure is effected.

When the brake pipe pressure has been reduced to a predetermined low degree, the spring 22 operates to shift the valve piston 14 back to its seat. The emergency reduction in brake pipe pressure causes the movement of the triple valve pistons to emergency position, so that an emergency application of the brakes is effected throughout the train.

The construction shown in Fig. 2 is similar to that shown in Fig. 1 except that the positions of the brake pipe check valve and the valve piston are reversed and a check valve 56 is provided in the quick service passage 51'. In the construction shown in Fig. 1, the check valve 19 prevents back flow through the quick service passage 51 to the brake pipe, while in the construction shown in Fig. 2 the check valve 56 prevents back flow.

The operation of the construction shown in Fig. 2 is substantially the same as that of the construction shown in Fig. 1. When fluid under pressure is vented from the spring side of the valve piston 14', by the opening of valve 30, the valve piston 14' is shifted downwardly by brake pipe pressure acting on the exposed area thereof, so that communication is opened from the brake pipe to the check valve 19'. The check valve 19' is then lifted from its seat, to permit the venting of fluid from the brake pipe to the brake cylinder.

While one illustrative embodiment of the invention has been described in detail, it is not our intention to limit its scope to that embodiment or otherwise than by the terms of the appended claims.

Having now described our invention, what we claim as new and desire to secure by Letters Patent, is:—

1. In a fluid pressure brake, the combination with a brake pipe, of valve means subject to the opposing pressures of the brake pipe and a chamber for controlling the venting of fluid from the brake pipe and means operated by an increase in brake pipe pressure for connecting said chamber to another chamber.

2. In a fluid pressure brake, the combination with a brake pipe, of valve means subject to the opposing pressures of the brake pipe and a chamber for controlling the venting of fluid from the brake pipe and a triple valve device subject to brake pipe pressure and having a position for connecting said chamber to another chamber.

3. In a fluid pressure brake, the combination with a brake pipe, of valve means subject to the opposing pressures of the brake pipe and a chamber for controlling the venting of fluid from the brake pipe, an auxiliary reservoir, and a triple valve device subject to the opposing pressures of the brake pipe and auxiliary reservoir and having a position for connecting said chamber to the auxiliary reservoir.

4. In a fluid pressure brake, the combination with a brake pipe, of valve means subject to the opposing pressures of the brake pipe and a chamber for controlling the venting of fluid from the brake pipe, an auxiliary reservoir, and a triple valve device comprising a piston subject to the opposing pressures of the brake pipe and auxiliary reservoir, a main slide valve, and a graduating valve, the main slide valve having a position for connecting said chamber to the auxiliary reservoir.

5. In a fluid pressure brake, the combination with a brake pipe, of valve means subject to the opposing pressures of the brake pipe and a chamber for controlling the venting of fluid from the brake pipe, an auxiliary reservoir, and a triple valve device comprising a piston subject to the opposing pressures of the brake pipe and auxiliary reservoir, a main slide valve, and a graduating valve, the main slide valve having a position for connecting said chamber to the auxiliary reservoir, communication from the chamber to the auxiliary reservoir being controlled by said graduating valve.

6. In a fluid pressure brake, the combination with a brake pipe, of valve means for controlling the venting of fluid under pressure from the brake pipe, a movable abutment subject to the opposing pressures of the brake pipe and a chamber for controlling the operation of said valve means, and a triple valve device subject to brake pipe pressure and having one release position in which said chamber is connected to another chamber and another release position in which communication between said chambers is cut off.

7. In a fluid pressure brake, the combination with a brake pipe, of valve means for controlling the venting of fluid under pressure from the brake pipe, a movable abutment subject to the opposing pressures of the brake pipe and a chamber for controlling the operation of said valve means, an auxiliary reservoir, and a triple valve device subject to the opposing pressures of the brake pipe and auxiliary reservoir, and having a release position in which said chamber is connected to the auxiliary reservoir and another release position in which communication from the chamber to the auxiliary reservoir is cut off.

8. In a fluid pressure brake, the combination with a brake pipe, of valve means for controlling the venting of fluid under pressure from the brake pipe, a movable abutment subject to the opposing pressures of the brake pipe and a chamber for controlling the operation of said valve means, an auxiliary reservoir, and a triple valve device subject to the opposing pressures of the brake pipe and the auxiliary reservoir and having a retarded release position and a full release position, said chamber being connected to the auxiliary reservoir in the retarded release position and communication between the chamber and the auxiliary reservoir being cut off in the full release position.

9. In a fluid pressure brake, the combination with a brake pipe, of a valve mechanism subject to the opposing pressures of the brake pipe and a chamber for controlling the venting of fluid under pressure from the brake pipe, an auxiliary reservoir, and a triple valve device comprising a main slide valve having a retarded release position in which said chamber is connected to the auxiliary reservoir and a full release position in which communication between said chamber and the auxiliary reservoir is cut off, a graduating valve having a movement relative to the main slide valve for cutting off communication between the chamber and the auxiliary reservoir with the main slide valve in the retarded release position, and a piston subject to the opposing pressures of the brake pipe and auxiliary reservoir for operating said valves.

10. In a fluid pressure brake, the combination with a brake pipe, of a valve mechanism subject to the opposing pressures of the brake pipe and a chamber for controlling the venting of fluid under pressure from the brake pipe and provided with an always open passageway connecting the brake pipe with said chamber, and a triple valve device having a release position in which said chamber is connected to another chamber.

11. In a fluid pressure brake, the combination with a brake pipe, of a valve mechanism subject to the opposing pressures of the brake pipe and a chamber for controlling the venting of fluid under pressure from the brake pipe and provided with an always open passageway connecting the brake pipe with said chamber, an auxiliary reservoir, and a triple valve device having a release position in which said chamber is connected to the auxiliary reservoir.

12. In a fluid pressure brake, the combination with a brake pipe, of a valve mechanism subject to the opposing pressures of the brake pipe and a chamber for controlling the venting of fluid under pressure from the brake pipe and provided with an always open passageway permitting flow of fluid from said chamber to the brake pipe at not to exceed a maximum service rate of reduction, and means operated upon increasing the brake pipe pressure for connecting said chamber to another chamber.

13. In a fluid pressure brake, the combination with a brake pipe, of a valve mechanism subject to the opposing pressures of the brake pipe and a chamber for controlling the venting of fluid under pressure from the brake pipe and provided with an always open passageway permitting flow of fluid from said chamber to the brake pipe at not to exceed a maximum service rate of reduction, an auxiliary reservoir, and a triple valve device having a release position in which the auxiliary reservoir is connected to said chamber, whereby said chamber cannot be charged with fluid from the brake pipe through said passageway faster than the auxiliary reservoir is charged.

In testimony whereof we have hereunto set our hands, signed by Thomas H. Thomas on the 9th day of May, 1928; and by Robert C. Burns on the 9th day of May, 1928.

THOMAS H. THOMAS.
ROBERT C. BURNS.